United States Patent [19]

Tollum

[11] Patent Number: 5,414,722
[45] Date of Patent: May 9, 1995

[54] SELECTIVE DATA SYNCHRONIZER

[75] Inventor: Ronald E. Tollum, Simi Valley, Calif.

[73] Assignee: Wangtek, Inc., Simi Valley, Calif.

[21] Appl. No.: 913,837

[22] Filed: Jul. 14, 1992

[51] Int. Cl.$^6$ .............................................. H04L 1/08
[52] U.S. Cl. .................................... 371/69.1; 360/45; 371/67.1
[58] Field of Search ...................... 371/69.1, 67.1, 62, 371/42, 48, 24, 25, 31, 47.1, 61; 365/201, 200; 328/120; 340/146.1 F; 395/550; 360/46, 48, 51, 53, 45; 375/118; 341/126, 132

[56] References Cited

U.S. PATENT DOCUMENTS

| | | | |
|---|---|---|---|
| 3,670,304 | 6/1972 | Andresen et al. | 340/146.1 F |
| 3,827,078 | 7/1974 | Bauer | 360/45 |
| 4,264,935 | 4/1981 | Lee | 360/45 |
| 5,068,754 | 11/1991 | Garde | 360/45 |
| 5,261,082 | 11/1993 | Ito et al. | 395/550 |

FOREIGN PATENT DOCUMENTS 2229613 9/1990 United Kingdom ................. 371/5.4

Primary Examiner—Robert W. Beausoliel, Jr.
Assistant Examiner—Phung M. Chung
Attorney, Agent, or Firm—Blakely, Sokoloff, Taylor & Zafman

[57] ABSTRACT

The present invention discloses a method and an apparatus for the detection and correction of incorrectly digitized read data pulses corresponding to the pulses of an analog read signal generated from the reading of data from a magnetic storage tape. Detection of incorrectly digitized read data pulses is performed by delaying the signal to obtain a nominal signal and delaying the nominal signal to obtain a late signal. A recovered clock signal is used to synchronize and detect each of the early, nominal and late signals to obtain early, nominal and late synchronized data signals consisting of binary values. A predetermined number of binary values of each of the synchronized data signals is stored within first, second and third memory means. These binary values are then compared to determine whether any of the corresponding read data pulses were detected within an incorrect timing cell of the recovered clock. If the binary values within a preselected cell of each of the synchronized data signals are not the same, error correction is performed by comparing the contents of the memory means with error patterns empirically derived and selecting an appropriate binary value as the correct output of the data separator. If no error exists, then the binary value of a preselected cell is chosen as the correct data separator output.

31 Claims, 4 Drawing Sheets

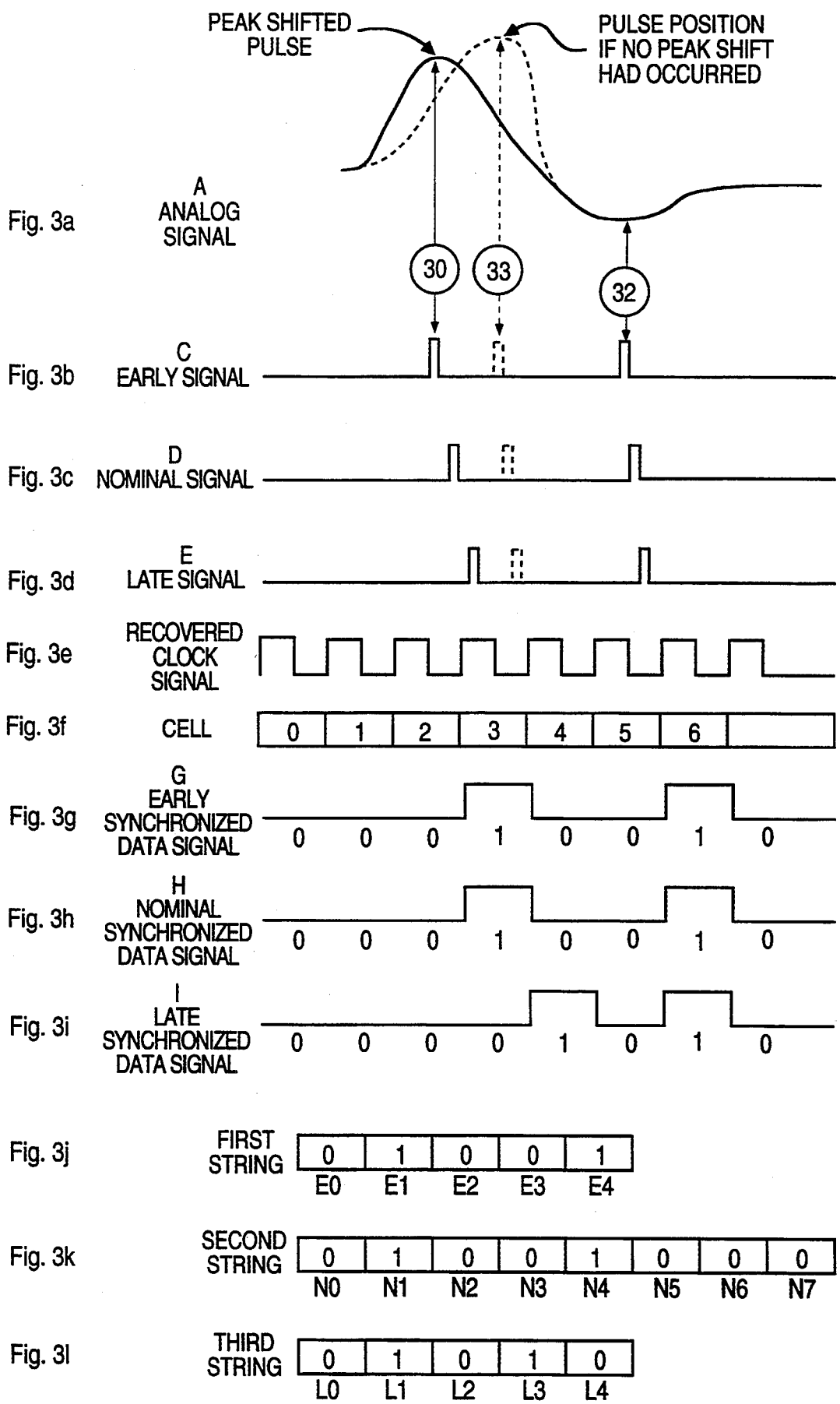

SELECTIVE DATA SYNCHRONIZER

BACKGROUND OF THE INVENTION

1. Field of the Invention

The present invention relates to the field of data processing, particularly the field of detecting and correcting incorrectly digitized read data pulses derived from the reading of data stored on a magnetic medium.

2. Prior Art

The recent advances in computer technology have provided for greater quantities of information in shorter periods of time. This has been achieved in part through high speed transmissions of data in bit streams. However, high speed transmissions cause a low tolerance for timing errors during data recovery from the bit stream. In particular, the high transmission rates dictate a smaller timing window for data recovery which increases the likelihood of an error in the recovered data.

Within the computer industry, the increase in computer speeds and data handling capabilities has produced a need for greater data storage and retrieval capabilities. In response to this need, tape drives have grown immensely in their storage capacity from thousands of bytes to gigabytes in part by increasing the packing densities. However, with the methods of data retrieval remaining relatively unchanged, the problem of accurately digitizing the analog signals produced by the read heads of these high capacity drives has become more difficult. Similar problems arise in other technologies including other magnetic recording technologies, optical disk systems, video systems, broadcast transmissions and communication systems.

A problem that commonly arises in attempting to read data from a high density medium is that of bit shifting. Bit shifting occurs when a pulse of the analog read signal is shifted out of its original position in the signal, which position is associated with the timing cells defined by a recovered clock signal. For example, when reading magnetic media such as magnetic tape, the recovered clock signal is generated by detecting a stream of read data pulses ("RDP") and outputting a recovered clock signal corresponding to the frequency with which the pulses occur in the analog signal.

The recovered clock signal defines a plurality of timing cells ("cells") which represent the intervals of time in which the analog pulses generated by the read head are detected as distinct digital values. When an analog pulse is displaced from its original position with respect to the cells of the recovered clock signal, the pulse may be subsequently digitized in an incorrect, adjacent cell and detected as representing the wrong binary value for the data read from the storage tape.

The source of a particular bit shift may be caused by a number of factors, but most notably and importantly are those of pulse crowding and jitter. Pulse crowding, otherwise known as intersymbol interference, occurs as a consequence of the magnetic transitions on the tape being recorded so close to each other that the pulses of the analog signal output from the read head superimpose to create a distorted pulse having a shifted peak. As the packing density of the tape increases, the bit shift errors due to pulse crowding also increase.

The most common type of output signal that can cause peak shift due to pulse crowding is what is known as an isolated di-bit. An isolated di-bit is two closely spaced pulses of opposite polarity which correspond to the two oppositely directed magnetic field reversals on the tape. For example, in the GCR code which is a 0,2 binary run length limited code, a valid data string does not require any zero values between one values, but cannot have more than two sequential zero values. A di-bit therefore occurs in the following sequence: 001100. In 1,7 code, a zero must occur between 1 values, but there can not be more than seven sequential zero values. A di-bit would therefore occur, for example, in the following sequence: 00001010000. In the case of a di-bit, peak shift may increase the separation between the peaks of the analog output signal. This peak displacement may thus create a discrepancy in the pulse location timing with respect to the cells of the recovered clock signal.

The other important cause of bit shifting, known in the art as jitter, is a result of electronic and media noise caused by mechanical vibrations, electrical fluctuations and the like being superimposed upon the pulses of the analog signal. As a result of the superimposition of the noise on the signal pulses, the peaks of the pulses may become displaced, thereby possibly causing a similar discrepancy in the pulse location timing with respect to the cells of the recovered dock signal.

Standard error correction circuits and/or processes, referred to as ECC circuits and processes, will detect and correct a limited number of correctable or "soft" errors. However, as the tape drive ages and/or the tape dimensions change (e.g., due to age and environmental condition changes), the number of soft errors may increase beyond the capability of the ECC process and a non-correctable or "hard" error occurs.

SUMMARY OF THE INVENTION

The present invention provides a method and apparatus for detecting and correcting soft errors generated during the recovery of data from a storage medium or transmission source. Soft errors occur as bits shift in time relative to a reference clock such that a bit appears to occur either earlier or later than originally specified. As packing densities increase and as data is transferred at higher rates, such soft errors tend to occur more frequently. Accordingly, once a soft error occurs, the present invention provides a means for detecting the error and determining the correct timing relationship of the error caused by a shifted bit with respect to the reference clock and the other bits in the bit stream.

In a preferred embodiment of the present invention, a method and an apparatus is provided to detect and correct incorrectly digitized read data pulses (RDP). Detection of incorrectly digitized read data pulses is performed by identifying the first signal of a data separator as the "early" signal and delaying the early signal to obtain a "nominal" signal, and similarly, delaying the nominal signal to obtain a delayed signal referred to as the "late" signal. Next, a recovered clock signal recovered from the nominal signal is used to synchronize and define common timing cells for each of the early, nominal and late signals. In this manner, it is possible to obtain early, nominal and late synchronized data signals consisting of binary values corresponding to the time variant analog read data pulses of the respective early, nominal and late signals.

The binary values of a predetermined number of cells are stored within a first, second and third memory means comprising first, second and third shift registers respectively. The stored binary values in these registers correspond to the early, nominal and late signals. The binary values are then tested to detect soft errors with a process that compares the binary values to determine whether the time variance of the read data pulses in combination with a possible bit shift produced sufficient displacement of a read data pulse to cause it to be incorrectly digitized in an incorrect adjacent cell. If the binary values of the synchronized data signals corresponding to the preselected cell are not the same, then one of the read data pulses may have shifted into an adjacent cell and the next step is to perform hardware error correction so that the correct binary value can be selected from either the early, nominal or late signals. If, however, no error is found to exist, then the binary value of the nominal signal is chosen as the correct data separator output.

BRIEF DESCRIPTION OF THE DRAWINGS

The objects, features and advantages of the present invention will become apparent from the following detailed description of the preferred embodiment in which:

FIGS. 3a through 3d represent timing charts showing the occurrence of a di-bit bit shift of a read data pulse caused by the pulse peak shifting of a pulse of the analog signal.

FIG. 3e represents the timing chart showing the recovered clock signal output of the clock recovery means of FIG. 2a and FIG. 3f illustrates the timing cells derived from the recovered clock signal of FIG. 3e.

FIGS. 3g through 3i represent timing charts showing the output of the data synchronizers of FIG. 2b.

FIGS. 3j through 3l represent the cells of the first, second and third strings of binary values corresponding to the contents of three shift registers, with the binary values themselves representing a determined di-bit error pattern.

DETAILED DESCRIPTION OF THE INVENTION

A method and device for the detection and correction of read data pulses that have been incorrectly digitized due to bit shifting is described. In the following description, numerous specific details are set forth such as circuit elements, device types, etc., in order to provide a thorough understanding of the present invention. It will be obvious, however, to one skilled in the art that these details are not required to practice the present invention. In other instances, well-known circuits, methods and the like are not set forth in detail in order to avoid unnecessarily obscuring the present invention.

Figure 1:
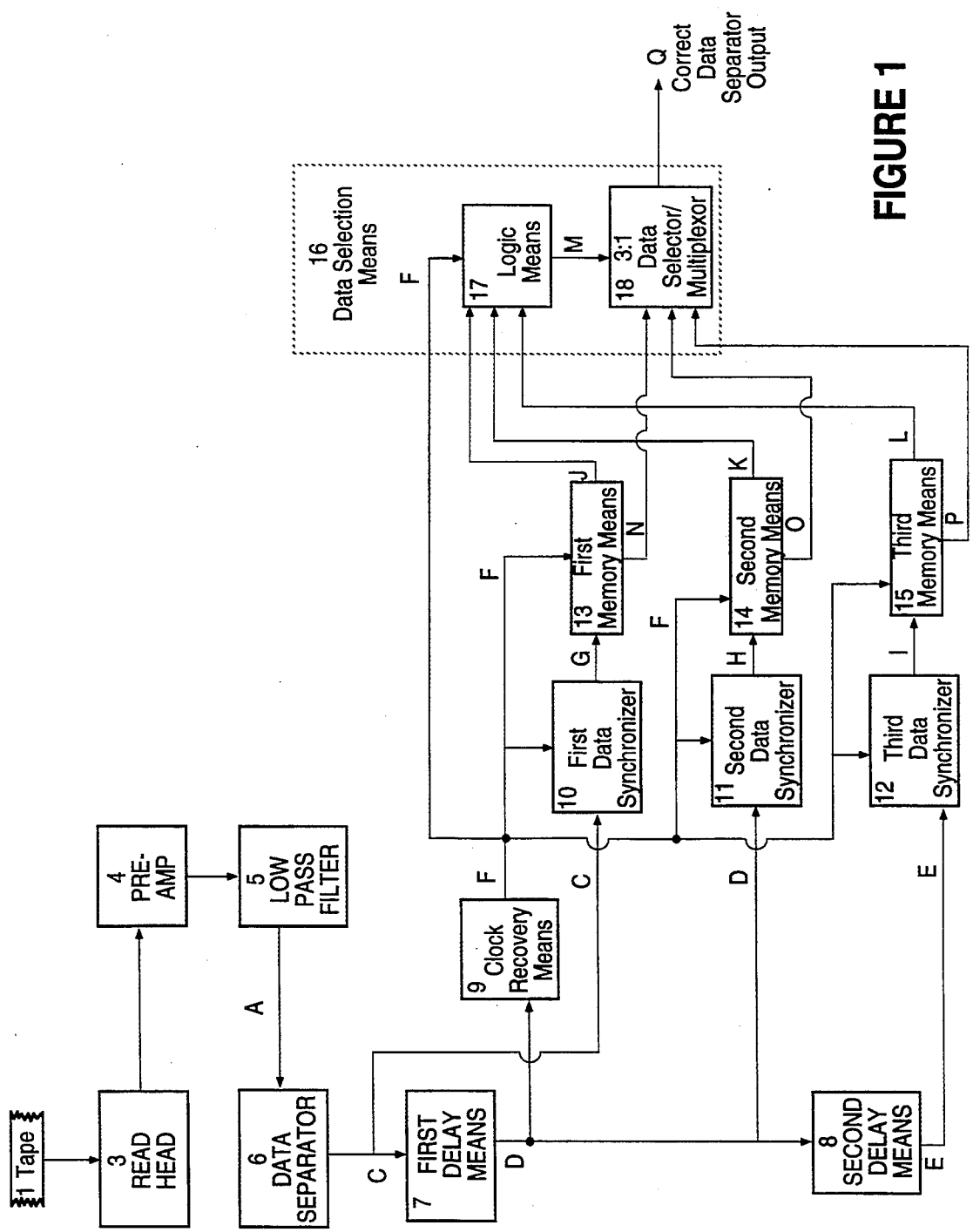
FIG. 1 is a block diagram of one preferred embodiment of the present invention.

For purposes of explanation, the following description describes the present invention as used with conventional means for the reading of data from magnetic storage tapes. However, it is contemplated that the present invention can be used in conjunction with the reading of other media, such as other magnetic media, optical media, and transmission media, including broadcast media. Referring to FIG. 1, the read head 3 of the tape drive reads the magnetic field transitions on the magnetic storage tape 1 to produce an analog signal having positive and negative pulses corresponding to the magnetic field transitions on the tape 1. Once generated, the analog signal is fed through a pre-amplifier 4 and a low pass filter 5 to generate signal A, with the low pass filter 5 being adjustable to compensate for the packing density of the data and the speed of the tape 1 past read head 3.

The analog signal A is next fed to a data separator 6. The data separator 6 digitizes both the positive and negative pulses at the location of their respective peaks and provides as an output a first signal C consisting of read data pulses ("RDP").

When the tape drive converts the data on the tape 1 into analog signal A, the peaks of the analog signal A may be shifted in time due to pulse crowding, jitter or other effects. Thus, the RDPs generated therefrom will be similarly affected.

The process and problems encountered due to pulse crowding and other effects are now explained with reference to FIGS. 3a through 3f. Referring to FIGS. 3a through 3f, the location of the read data pulses in the first signal C is determined by the position of the pulse peaks 30, 32 of the analog signal A. As will be explained subsequently, these RDPs are used to generate a recovered clock signal (illustrated by FIG. 3e). In the present illustration, the sequence of cells used to determine the digital output pulses are defined in accordance with the rising edges of the recovered clock signal. This is illustrated in FIG. 3f. In the example of the di-bit given above, the peak of the positive analog pulse 30 has been shifted from its original position 33 such that the corresponding read data pulse output from the data separator in the early signal C and nominal signal D is detected in another cell of the recovered clock signal F, i.e. in the third cell (N3) of the recovered clock signal F rather than the fourth cell (N4). As will be realized from the subsequent discussion, the pulses which appear in the early nominal and late data signals (FIGS. 3g-3i) appear in the adjacent timing cells subsequent to timing cells during which the corresponding peaks in the early, nominal and late signals occur (FIGS. 3b-3d).

With reference to the block diagram of the preferred embodiment shown in FIG. 1, signal C of the data separator 6 is identified as the "early" signal. The early signal is applied to a first delay means 7 to generate the "nominal" signal D delayed from the early signal by a first predetermined amount of time. The nominal signal D is similarly applied to a second delay means 8 to generate the "late" signal E delayed from the nominal signal by a second predetermined amount of time. The first and second predetermined amount of time are preferably chosen to encompass the range of shifting, due to pulse crowding or jitter, ahead and behind of the location at which the pulse is to be located. Without the displacement due to a bit shift, the read data pulses of the early, nominal and late signals C, D, E would remain within the same cell and therefore, no correction would be required. In the preferred embodiment of the present invention, the first and second predetermined times are chosen to correspond to twenty percent of the duration or width of a timing cell of the recovered clock signal F since it has been determined that bit shift displacement is typically less than twenty percent of a cell width. However, it will be apparent to those skilled in the art that other fractional delay times may be used without detracting from the achievements of the present invention.

Referring back to FIG. 1, the nominal signal D is applied to a clock recovery means 9 to generate a recovered clock signal F. The early, nominal and late signals C, D, E are next applied to first, second and third data synchronizing means 10, 11, 12, respectively, along with the recovered clock signal F, to generate early, nominal and late synchronized data signals G, H, I. In the preferred embodiment of the present invention, the clock recovery means 9 preferably comprises a phase-locked loop.

Figure 2A:
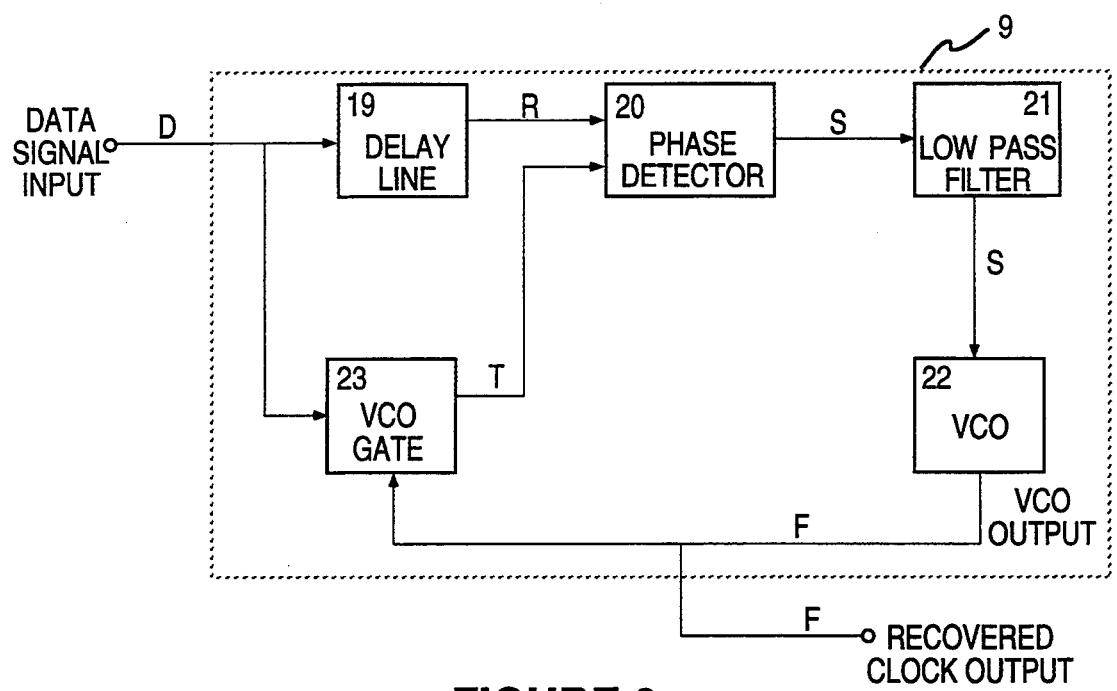
FIG. 2a is a circuit diagram of a phased-locked loop used as a clock recovery means in the present invention.

As shown in FIG. 2a, the phase-locked loop used as the clock recovery means 9 comprises a voltage-controlled oscillator 22 that produces as an output a recovered clock signal F phase-synchronized to the read data pulses (RDP) of the nominal signal D. the RDP signal input D is input to delay line 19 and VCO gate 23. The delay line 19 delays the RDP input approximately one-half a cell such that the signal R output from the delay line 19 reaches the phase detector 20 approximately at the same time signal T reaches the phase detector 20. Signal T is output from the VCO gate 23 upon assertion of RDP signal D which "opens" VCO gate 23. The gate 23 immediately "closes" after output of signal T to prevent subsequent signals from VCO 22 input to VCO gate 23 from reaching the phase detector 20 until the next RDP is received as input at which time VCO gate 23 is "opened".

The phase detector 20 generates an output indicative of the phase difference between the RDP input D and the VCO gate output T which is then filtered by low pass filter 21 to smooth out the signal to produce signal S. Signal S is input to voltage controlled oscillator VCO 22 as control input and the VCO 22 adjusts the output signal F in accordance with received control input signal S. The output signal F is output as the recovered clock signal and as the input to VCO gate 23. This process continues for each RDP received to generate the recovered clock signal. As illustrated in FIG. 1, the recovered clock signal F is applied as input to data synchronizing means 10, 11, 12 which synchronize the early nominal and late signal data to the recovered clock signal.

Figure 2B:
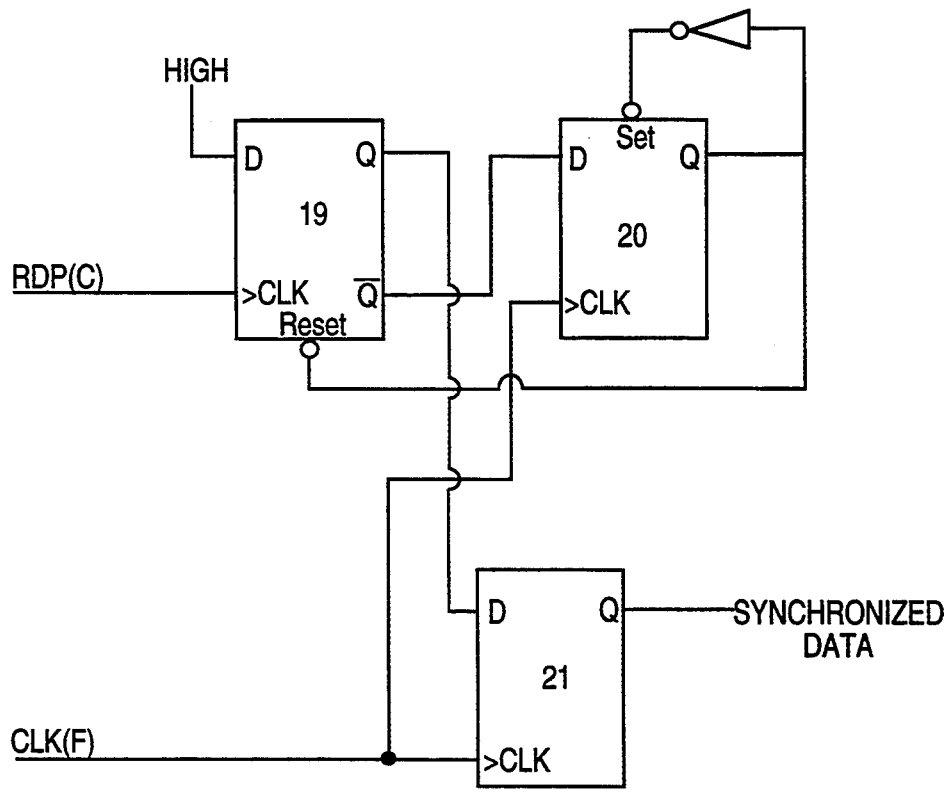
FIG. 2b is a simplified block diagram illustrative of the data synchronizers shown in FIG. 1.

FIG. 2b is a simplified block diagram illustrative of the data synchronizers 10, 11, 12 shown in FIG. 1. A data synchronizer such as that shown in FIG. 2b may be used in the present invention; however, it will be apparent to one skilled in the art that other data synchronizers may be used. Referring to FIG. 2b, the RDP signal (i.e., the early RDP signal C, nominal RDP signal D or late RDP signal E) is applied as a clock input to a flip flop 19. The input to the flip flop 19 is set to high such that the output (Q) is high when a RDP pulse is received at the clock input. The second flip flop 20 functions to reset the flip flop 19 one recovered clock (signal F) later thereby generating a pulse.

Flip flop 21 receives as input the output from flip flop 19. In accordance with the recovered clock signal F, the input is output from the flip flop 21 as synchronized data in NRZ (no return to zero) form. Therefore, since the data synchronizers 10, 11, 12 which respectively process the early nominal and late signals receive as input the recovered clock signal generated from the nominal signal, thereby synchronizing the early, nominal and late signals.

As shown in FIGS. 3g–3i, the early, nominal and late synchronized data signals G, H, I may be represented as streams of binary values corresponding to the read data pulses of the early, nominal and late signals C, D, E, wherein a binary one represents the presence of a read data pulse and a binary zero represents the absence of a read data pulse. In the operation of the data synchronizers 10, 11, 12, a binary one will be output from the flip flop (21) only when a read data pulse is applied before the rising edge of a clock pulse in the recovered clock signal F. In reference to the di-bit example of FIG. 3, the read data pulses of the early and nominal signals C, D have been sufficiently shifted to the left that they occur before the rising edge of the fourth clock pulse in the recovered clock signal F. Hence, a binary one is output in the fourth cell of the early and nominal synchronized data signals G, H corresponding to the fourth cell of the recovered clock signal F of FIG. 3e. On the other hand, the left read data pulse of the late signal E has occurred after the rising edge of the fourth clock pulse so a binary zero is output in the fourth cell and a binary one is output in the fifth cell of the late synchronized data signal I.

Referring back to FIG. 1, the early, nominal and late synchronized data signals G, H, I are applied to first, second and third memory means 13, 14, 15 along with the recovered clock signal F to store the binary values of the synchronized data signals G, H, I therein. The purpose of the memory means 13, 14, 15 is to store a predetermined number of binary values of the synchronized data signals G, H, I so that they may be analyzed to determine whether the corresponding read data pulses of the early, nominal and late signals C, D, E have been correctly digitized by the data separator 6 in an adjacent cell.

The first, second and third memory means 13, 14, 15 comprise shift registers having five, eight and five D-type flip flops respectively or may comprise dedicated RAM bits in system memory or some other memory location. In this respect, contents of the first, second and third memory means 13, 14, 15 correspond to first, second and third strings of binary values (shown in FIGS. 3j–3l) of the early, nominal and late synchronized data signals G, H, I (FIG. 1), respectively.

For purposes of explanation, each cell within the first, second and third strings has been identified with a specific symbol as shown in FIGS. 3j–3l for use in formulating Boolean expressions. Hence, N0, N1, N2, N3, N4, N5, N6, and N7 represent the binary values within the zeroth, first, second, third, fourth, fifth, sixth, and seventh cell of the nominal synchronized signal H. Similarly, E0, E1, E2, E3, E4 and L0, L1, L2, L3, L4 represent the binary values within the zeroth, first, second, third, and fourth cell of the early and late synchronized signals G and I, respectively. The actual binary values shown in the cells of FIGS. 3j–3l correspond to the binary values of the synchronized data signals G, H, I derived from the given di-bit example. It is noted that in the timing charts shown in FIGS. 3g–3i, the pulses which are first in time are shown to the left of later pulses, whereas in a shift register, as shown in FIGS. 3j–3l, the temporally first pulses are input to the shift register on the left side and are shifted to the right as later pulses are detected.

In order to generate the correct output Q corresponding to the output of data separator 6, the apparatus and methods of the present invention are designed to first perform error detection to see if it is likely that a read data pulse has shifted into an adjacent cell. If a likely error is detected, then error correction is performed to determine the appropriate binary value that should be selected as the correct output Q. In this regard, a data selection means 18 comprising a three-to-one data selector/multiplexor 18 and a logic means 17 is provided. Logic means 17 first determines whether an error exists, and if one does, then determines the correct binary value to be selected. If an error does not exist, then the binary value of a preselected cell will be chosen as the correct output Q. The data selector/multiplexor 18 then selects the appropriate binary value.

In performing error detection with the 1, 7 code waveform, the logic means 17 of the preferred embodiment compares the binary values within the fourth cell of the first and third strings E4, L4. If the compared binary values are the same, then no error is found to exist, and the data selection means selects the binary value within the fourth cell N4 of the second string. If the binary values within the fourth cell of the first and third strings E4, L4 are not the same, then an error is likely to exist and error correction is performed. Preferably, error correction is performed by the logic means comparing the binary values within the cells of the first, second and third strings with stored binary values corresponding to known expected error patterns.

The error patterns expected to be found consist of binary values which have been empirically derived by analyzing the binary values which result from specific causes of the bit shift phenomenon. By matching an error pattern with the first, second and third strings of detected binary values, an empirically derived binary value representing the correct output Q for the data separator 6 may be generated so as to select a corresponding binary value from those appearing in the fourth cell of each string E4, N4, L4.

In one embodiment, for example, a programmable logic array may be utilized to compare the stored binary values of the strings with preselected binary values of error patterns fixed within its circuitry. When the binary values of the strings match an error pattern wired into the programmable logic array, the appropriate binary value is then generated as output from the programmable logic array. This determination of the correct binary value may alternately be performed through the use of an algorithm as will be shown below. It will further be obvious to those skilled in the art that other processes may also be used for determining the type of error and generating the correct output.

Continuing with the present example for error correction of 1, 7 coded data, when the correct binary value has been determined by the logic means 17, the logic means 17 controls the data selector 18 to select the fourth cell N4 of the second string (corresponding to the nominal signal) if the binary values within the cells of the second string are determined to be correct. If the binary values within the cells of the second string are not correct, then the logic means 17 controls the data selector 18 to select the fourth cell of either the first string E4 (corresponding to the early signal) or the third string L4 (corresponding to the late signal), whichever is deemed to be correct.

This method of data selection may also be varied so that the correct output Q always appears in the fifth cell N5 of the second string. In this way, if the binary value of the fourth cell N4 of the second string is determined to be correct, the fourth cell of the first and third strings E4, L4 will take on the binary value of the third cell N3 of the second string, and the fifth cell N5 of the second string will take on the binary value of the fourth cell N4 of the second string during the next clock cycle. If the binary value of the fourth cell L4 of the third string is determined to be correct, the fourth cell of the first and second strings E4, N4 will take on the binary value of the third cell L3 of the third string, and the fifth cell N5 of the second string will take on the binary value of the fourth cell L4 of the third string during the next clock cycle. Similarly, if the binary value of the fourth cell E4 of the first string is determined to be correct, the fourth cell of the second and third strings N4, L4 will take on the binary value of the third cell E3 of the first string, and the fifth cell N5 of the second string will take on the binary value of the fourth cell E4 of the first string during the next clock cycle.

In the 1, 7 code di-bit example given above, it has been determined that an error exists with respect to the binary values shown in FIGS. 3j–3l since the binary values within the fourth cell of the first and third strings E4, L4 are not the same. In addition, by matching the binary values within all the cells of each string to preselected binary values of an error pattern, it may be determined that the binary values within the late signal are correct. Therefore, the logic means 17 generates a select signal M directing the data selector 18 to choose line P from the third memory means 15 as the correct data separator output Q which contains the correct binary value within the fourth cell L4 of the third string. As described above, this can be done by shifting the binary value within the fourth cell L4 of the third string into the fifth cell N5 of the second string and then selecting that binary value as the correct output Q.

In an alternate embodiment of the present invention, the step of first determining whether an error exists can be bypassed so as to simply compare all the binary values within the first, second and third strings with preselected binary values representing the different error patterns expected to occur. In this embodiment, the binary value within the fourth cell N4 of the second string will be selected if no error patterns match the binary values within the first, second and third strings. Otherwise, if a preselected error pattern is matched, then the above data selection procedure is used to select the appropriate binary value.

In a second alternate embodiment, error correction algorithms may be devised for each of the error patterns most likely expected to occur, and these algorithms may be implemented in the logic of the data selection means 16 by way of software or hardware. As an example, the flow chart shown in FIG. 4 represents an algorithm for the detection and correction of an error.

Figure 4:
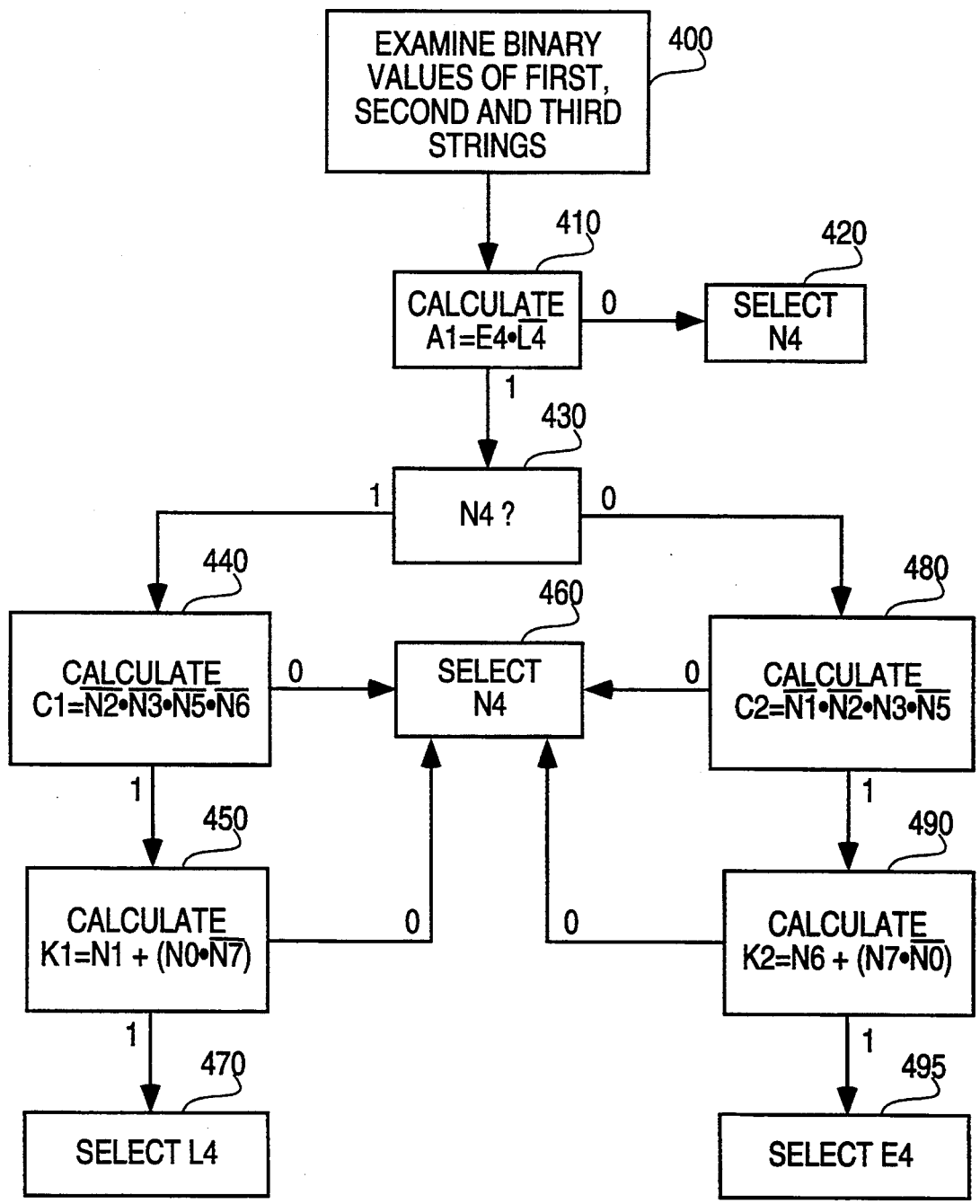
FIG. 4 is a flow chart showing one preferred process for selecting the correct data separator output.

In order to determine what the correct output should be for the example shown in FIG. 4 at step 400, the binary value of the first, second and third strings are examined. At step 410, we first calculate the Boolean value of $A1 = E4 \cdot LA$. If $A1 = 0$, then N4 is selected, step 420. If $A1 = 1$ and $N4 = 1$, step 430 then the Boolean value of $C1 = N2 \cdot N3 \cdot N5 \cdot N6$ is calculated, step 440. If $C1 = 0$, then N4 is selected. If $C1 = 1$, then the Boolean value of $K1 = N1 + (N0 \cdot N7)$ is calculated, step 450. If $K1 = 0$, then N4 is selected, step 460. If $K1 = 1$, then L4 is selected, step 470. However, if $A1 = 1$ and $N4 = 0$, the Boolean value of $C2 = N1 \cdot N2 \cdot N3 \cdot N5$ is calculated, step 480. If $C2 = 0$, then N4 is selected, step 460. If $C2 = 1$, then the Boolean value of $K2 = N6 + (N7 \cdot N0)$ is calculated, step 490. Finally, if $K1 = 0$, then N4 is selected, step 460. And if $K1 = 1$, E4 is selected, step 495.

Although not required, it is preferred that the present invention is utilized in conjunction with standard ECC processes and circuits to decrease the overall error rate. Through use of the present invention, the number of soft errors detected by the ECC circuit is decreased thereby decreasing the probability of occurrence of hard errors.

While the invention has been described in conjunction with the preferred embodiment, it is evident that numerous alternatives, depictions, variations and uses will be apparent to those skilled in the art in light of the foregoing description. Specifically, many different processes, circuits, subcircuits and elements therein may be used so as to obtain the corresponding relationships described in the methods and algorithm herein claimed. Furthermore, the concepts described herein can be readily applied to different binary codes and transmission media.

I claim:

1. In a magnetic storage mechanism for reading data stored on a magnetic medium, said magnetic storage mechanism comprising a read head for reading said data stored on said medium and generating analog pulses, and a data separator coupled to the read head for generating as output a signal having digital read data pulses (RDP) corresponding to peaks of said analog pulses, a method for detection and correction of incorrectly digitized read data pulses, said method comprising the steps of:

delaying said signal by a first predetermined time to generate a nominal signal;

delaying said nominal signal by a second predetermined time to generate a late signal;

detecting a first predetermined number of binary values of said signal, said signal being an early signal relative to the nominal signal;

detecting a second predetermined number of binary values of said nominal signal;

detecting a third predetermined number of binary values of said late signal;

comparing a selected one of the detected binary values in the first and third predetermined numbers of binary values;

selecting a determined correct output of said data separator from said selected one of the detected binary values of said first, said second and said third predetermined numbers of binary values.

2. The method of claim 1, further comprising the step of generating a recovered clock signal from said nominal signal, a period of said recovered clock signal delineating timing cells.

3. The method of claim 2, wherein said step of generating a recovered clock signal from said nominal signal is performed by synchronizing an oscillating signal with said nominal signal.

4. The method of claim 2, wherein said early, nominal and late signals are synchronized with said recovered clock signal before said first, said second and said third predetermined numbers of binary values are detected.

5. The method of claim 2, wherein said first and said second predetermined times comprise time delays of between ten percent and twenty five percent of a width of a timing cell of said recovered clock signal.

6. The method of claim 2, wherein said first and said second predetermined times comprise time delays which reflect an amount of time displacement of a read data pulse from said timing cells of said recovered clock signal that typically occurs due to bit shifting.

7. The method of claim 2, wherein said first, second and third predetermined number of binary values respectively form first, second and third strings and said step of selecting a determined correct output further comprises the steps of:

comparing binary values within a preselected timing cell of said first, said second and said third strings;

selecting the binary value within said preselected timing cell of said second string as said determined correct output when said binary values within a preselected timing cell of said first, said second and said third strings have the same value;

evaluating the contents of said preselected timing cell by means of a Boolean algorithm to determine if an error is likely to have occurred;

selecting a binary value within said preselected timing cell of said first string as said correct output when said binary values of said first string are determined to be correct with respect to said preselected binary values of said error pattern;

selecting a binary value within said preselected timing cell of said second string as said correct output when said binary values of said second string are determined to be correct with respect to said preselected binary values of said error pattern; and selecting a binary value within said preselected timing cell of said third string as said correct output when said binary values of said third string are determined to be correct with respect to said preselected binary values of said error pattern.

8. The method of claim 7, wherein said first, said second and said third strings comprise five, eight and five binary values respectively.

9. The method of claim 8, wherein said data comprises a 1, 7 code, and N0, N1, N2, N3, N4, N5, N6, and N7 represent binary values at a zeroth, first, second, third, fourth, fifth, sixth, and seventh timing cell of said second string, respectively, and E4 and L4 represent binary values of a fourth timing cell of said first and third strings, respectively, said step of correct output selection for a determined error pattern comprises the steps of:

Calculating a Boolean value of A1=E4·L4;
  selecting N4 when A1=0;
  calculating a Boolean value of C1=N2·N3·N5·N6 when A1=1 and N4=1;
  selecting N4 when C1=0;
  calculating a Boolean value of K1=N1+(N0·N7) when C1=1;
  selecting N4 when K1=0;
  selecting L4 when K1=1;
  calculating a Boolean value of C2=N1·N2·N3·N5 when A1=1 and N4=0;
  selecting N4 when C2=0;
  calculating the Boolean value of K2=N6+(N7·N0) when C2=1;
  selecting N4 when K2=0; and selecting E4 when K2=1.

10. The method of claim 1, further comprising the step of:

applying said early, nominal and late signals to first, second and third memory means, respectively, to store consecutive binary values of said first, second and third predetermined numbers of binary values of said early, nominal and late signals, respectively.

11. The method of claim 1, wherein said step of selecting a determined correct output comprises the steps of:

determining whether said binary values of said first, said second and said third numbers of binary values are correct; and selecting an appropriate binary value from one of said binary values of said first, said second and said third numbers of binary values.

12. In a magnetic storage mechanism for reading data stored on a magnetic medium, said magnetic storage mechanism comprising a read head for reading said data stored on said magnetic medium and generating analog pulses, and a data separator coupled to the read head for generating as output a first digital signal comprising having digital read data pulses corresponding to said analog pulses, an apparatus for correction of incorrect digital read data pulses, said apparatus comprising:

a first delay means for receiving said first digital signal corresponding to an early signal and outputting a nominal signal delayed by a first predetermined time;

a second delay means for receiving said nominal signal and outputting a late signal delayed by a second predetermined time;

comparison means for comparing a selected binary value of the early and late signals;

data selection means for selecting a determined correct output of said data separator from the selected binary values of said early, nominal and late signals.

13. The apparatus of claim 12, further comprising:

a first memory means for receiving said early signal and storing said binary values of said early signal;

a second memory means for receiving said nominal signal and storing said binary values of said nominal signal; and a third memory means for receiving said late signal and storing said binary values of said late signal.

14. The device of claim 13, wherein said data selection means comprises a logic means to determine whether an error exists in said binary values stored within said first, said second and said third memory means and to determine an appropriate binary value from said binary values stored within said first, said second and said third memory means to select said correct output.

15. The device of claim 14, wherein said logic means comprises a programmable logic array circuit.

16. The device of claim 14, wherein said data selection means further comprises a data selector responsive to an output of said logic means for selecting an appropriate binary value as said correct output from said binary values stored within said first, said second and said third memory means.

17. The device of claim 14, wherein said data selection means further comprises:

a first logic means for comparing binary values within a preselected cell of said first, said second and said third memory means;

a first data selector for selecting a binary value within said preselected cell of said second memory means as said correct output when said binary values within said preselected cell of said first, said second and said third memory means have the same value;

a second logic means for choosing an error pattern consisting of preselected binary values corresponding to said binary values of said first, said second and said third memory means when said binary values within said preselected cell of said first, said second and said third memory means do not have the same value;

a second data selector for selecting a binary value within said preselected cell of said first memory means as said correct output when said binary values of said first memory means are determined to be correct with respect to said preselected binary values of said error pattern;

a third data selector for selecting a binary value within said preselected cell of said second memory means as said correct output when said binary values of said second memory means are determined to be correct with respect to said preselected binary values of said error pattern; and a fourth data selector for selecting a binary value within said preselected cell of said third memory means as said correct output when said binary values of said third memory means are determined to be correct with respect to said preselected binary values of said error pattern.

18. The device of claim 14, wherein said data selection means further comprises:

a first logic means for comparing said binary values of said first, said second and said third memory means with error patterns of preselected binary values;

a second logic means for determining if an error pattern is represented by said binary values of said first, said second and said third memory means;

a first data selector for selecting a binary value within a preselected cell of one of said first, said second and said third memory means if an error pattern is represented and said selected binary value is determined to be correct with respect to said represented error pattern; and a second data selector for selecting a binary value within said preselected cell of said second memory means if no error pattern is represented by said binary values of said first, said second and said third memory means.

19. The device of claim 18, wherein said first, second and third memory means of said cells comprise five, eight and five cells having five, eight and five binary values therein respectively.

20. The device of claim 19, wherein said data comprises a 1, 7 code, and N0, N1, N2, N3, N4, N5, N6, and N7 represent binary values of a zeroth, first, second, third, fourth, fifth, sixth, and seventh cell of said second memory means, respectively, and E4 and L4 represent binary values of a fourth cell of said first and third memory means, respectively, said data selection means further comprising means for selecting the correct output selection of a determined di-bit error pattern, said correct output selection means comprising:

a first logic means for calculating a Boolean value of $A1 = E4 \cdot L4$;

a first binary selection means for selecting N4 when $A1 = 0$;

a second logic means for calculating a Boolean value of $C1 = N2 \cdot N3 \cdot N5 \cdot N6$ when $A1 = 1$ and $N4 = 1$;

a second binary selection means for selecting N4 when $C1 = 0$;

a third logic means for calculating a Boolean value of $K1 = N1 + (N0 \cdot N7)$ when $C1 = 1$;

a third binary selection means for selecting N4 when $K1 = 0$;

a fourth binary selection means for selecting L4 when $K1 = 1$;

a fourth logic means for calculating a Boolean value of $C2 = N1 \cdot N2 \cdot N3 \cdot N5$ when $A1 = 1$ and $N4 = 0$;

a fifth binary selection means for selecting N4 when $C2 = 0$;

a fifth logic means for calculating a Boolean value of $K2 = N6 + (N7 \cdot N0)$ when $C2 = 1$;

a sixth binary selection means for selecting N4 when K1=0; and a seventh binary selection means for selecting E4 when K1=1.

21. The apparatus of claim 12, further comprising a clock recovery means for receiving said nominal signal and outputting a recovered clock signal, a period of said recovered clock signal delineating timing cells.

22. The apparatus of claim 21, wherein said clock recovery means comprises a phase-locked loop for receiving said nominal signal as input and outputting said recovered clock signal synchronized with said nominal signal.

23. The apparatus of claim 21, further comprising first, second and third data synchronizing means for receiving said early, nominal and late signals, respectively, and respectively outputting said early, nominal and late signals synchronized with said recovered clock signal.

24. The device of claim 21, wherein said first and said second predetermined times comprise time delays between ten percent and twenty five percent of a width of a cell of said recovered clock signal.

25. The device of claim 21, wherein said first and said second predetermined times comprise time delays which reflect an amount of displacement of a read data pulse with respect to said timing cells of said recovered clock signal that typically occurs due to bit shifting.

26. The device of claim 21, wherein said first, said second and said third memory means store first, second and third predetermined numbers of binary values of said early, nominal and late synchronized data signals, respectively, with said first, said second and said third predetermined numbers of binary values corresponding to first, second and third strings of timing cells of said recovered clock signal.

27. In an apparatus for reading data from an incoming stream of pulses, said apparatus comprising a read means for reading said incoming stream of pulses and a data separator coupled to the read means for generating as output a signal having digital read data pulses corresponding to peaks of pulses of the incoming stream of pulses, an apparatus for detection and correction of incorrectly digital read data pulses comprising:

a first delay means for delaying said signal a first period of time, said signal being an early signal, said first delay means generating a nominal signal;

clock recovery means for generating a recovered clock signal from the nominal signal, a period of the nominal signal delineating timing cells;

a second delay means for delaying the nominal signal by a second period of time to generate a late signal;

means for generating binary strings of values corresponding to the read data pulses which occur within timing cells, said means coupled to the data separator to receive said early signal and outputs a first binary string, said means further coupled to the first delay means to receive said nominal signal and outputs a second binary string, and said means for generating coupled to the second delay means to receive said late signal and outputs a third binary string; and data selection means coupled to the means for generating binary strings to receive the first, second and third binary strings, for each timing cell, said data selection means selecting determined correct data output from one of the binary strings.

28. The apparatus as set forth in claim 27, wherein said data selection means further comprises:

a first logic means for comparing binary values within a preselected cell of said first, said second and said third strings;

a first data selector for selecting a binary value within said preselected cell of said second string as said correct output when said binary values within said preselected cell of said first, said second and said third strings have the same value;

a second logic means for choosing an error pattern consisting of preselected binary values corresponding to said binary values of said first, said second and said third strings when said binary values within said preselected cell of said first, said second and said third strings do not have the same value;

a second data selector for selecting a binary value within said preselected cell of said first string as said correct output when said binary values of said first string are determined to be correct with respect to said preselected binary values of said error pattern;

a third data selector for selecting a binary value within said preselected cell of said second string as said correct output when said binary values of said second string are determined to be correct with respect to said preselected binary values of said error pattern; and a fourth data selector for selecting a binary value within said preselected cell of said third string as said correct output when said binary values of said third string are determined to be correct with respect to said preselected binary values of said error pattern.

29. The apparatus as set forth in claim 27, wherein said data selection means comprises:

a first logic means for comparing said binary values of said first, said second and said third strings with error patterns of preselected binary values;

a second logic means for determining if an error pattern is represented by said binary values of said first, said second and said third strings;

a first data selector for selecting a binary value within a preselected cell of one of said first, said second and said third strings if an error pattern is represented and said selected binary value is determined to be correct with respect to said represented error pattern; and a second data selector for selecting a binary value within said preselected cell of said second string if no error pattern is represented by said binary values of said first, said second and said third strings.

30. The apparatus as set forth in claim 27, wherein said data comprises a 1, 7 code and N0, N1, N2, N3, N4, N5, N6, and N7 represent binary values of a zeroth, first, second, third, fourth, fifth, sixth, and seventh cell of said second string, respectively, and E4 and L4 represent binary values of a fourth cell of said first and third strings, respectively, said data selection means further comprising means for selecting the correct output selection of a determined di-bit error pattern, said correct output selection means comprising:

a first logic means for calculating a Boolean value of $A1 = E4 \cdot L4$;

a first binary selection means for selecting N4 when $A1 = 0$;

a second logic means for calculating a Boolean value of $C1 = N2 \cdot N3 \cdot N5 \cdot N6$ when $A1 = 1$ and $N4 = 1$;

a second binary selection means for selecting N4 when C1=0;

a third logic means for calculating a Boolean value of K1=N1+(N0·N7) when C1=1;

a third binary selection means for selecting N4 when K1=0;

a fourth binary selection means for selecting L4 when K1=1;

a fourth logic means for calculating a Boolean value of C2=N1·N2·N3·N5 when A1=1 and N4=0;

a fifth binary selection means for selecting N4 when C2=0;

a fifth logic means for calculating a Boolean value of K2=N6+(N7·N0) when C2=1;

a sixth binary selection means for selecting N4 when K1=0; and a seventh binary selection means for selecting E4 when K1=1; further comprising a data synchronizing means to synchronize said early, nominal and late signals with the recovered clock signal.

31. In a magnetic tape drive mechanism for reading data stored on a magnetic tape, said magnetic tape drive mechanism comprising a read head for reading said data stored on said magnetic tape as analog pulses and a data separator coupled to the read head for generating as output a first signal having digital read data pulses corresponding to said analog pulses, a method for detection and correction of incorrectly digitized read data pulses, said method comprising the steps of:

delaying said first signal by a first predetermined time to generate a nominal signal;

synchronizing an oscillating signal with said nominal signal to generate a recovered clock signal;

synchronizing an early signal corresponding to said first signal with said recovered clock signal to generate an early synchronized data signal;

synchronizing said nominal signal with said recovered clock signal to generate a nominal synchronized data signal;

delaying said nominal signal by a second predetermined time to generate a late signal;

synchronizing said late signal with said recovered clock signal to generate a late synchronized data signal;

detecting a first predetermined number of binary values of said early synchronized data signal corresponding to a first string of timing cells of said recovered clock signal having a series of detected binary values;

detecting a second predetermined number of binary values of said nominal synchronized data signal corresponding to a second string of timing cells of said recovered clock signal having a series of detected binary values;

detecting a third predetermined number of binary values of said late synchronized data signal corresponding to a third string of timing cells of said recovered clock signal having a series of detected binary values; and selecting a correct output of said data separator from said binary values of said first, said second and said third strings, said step of correct output selection comprising the steps of:

comparing binary values within a preselected cell of said first, said second and said third strings;

selecting a binary value within said preselected cell of said second string as said correct output when said binary values within said preselected cell of said first, said second and said third strings have the same value;

choosing an error pattern consisting of preselected binary values corresponding to said binary values of said first, said second and said third strings when said binary values within said preselected cell of said first, said second and said third strings do not have the same value;

selecting a binary value within said preselected cell of said first string as said correct output when said binary values of said first string are determined to be correct with respect to said preselected binary values of said error pattern;

selecting a binary value within said preselected cell of said second string as said correct output when said binary values of said second string are determined to be correct with respect to said preselected binary values of said error pattern; and selecting a binary value within said preselected cell of said third string as said correct output when said binary values of said third string are determined to be correct with respect to said preselected binary values of said error pattern.

* * * * *